(12) United States Patent
Kennis

(10) Patent No.: US 8,634,088 B2
(45) Date of Patent: Jan. 21, 2014

(54) PRINT SYSTEM

(75) Inventor: Albert Kennis, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 1975 days.

(21) Appl. No.: 11/444,777

(22) Filed: Jun. 1, 2006

(65) Prior Publication Data

US 2006/0274343 A1 Dec. 7, 2006

(30) Foreign Application Priority Data

Jun. 2, 2005 (JP) ................................. 2005-163291
Jun. 2, 2005 (JP) ................................. 2005-163292

(51) Int. Cl.
*G06F 3/12* (2006.01)
*G06F 15/00* (2006.01)
*G06K 1/00* (2006.01)

(52) U.S. Cl.
USPC .......................... 358/1.15; 358/1.9; 358/1.13

(58) Field of Classification Search
USPC ....................................................... 358/1.11
See application file for complete search history.

(56) References Cited

U.S. PATENT DOCUMENTS

| | | | |
|---|---|---|---|
| 5,960,167 A * | 9/1999 | Roberts et al. ............... | 358/1.15 |
| 6,223,234 B1 | 4/2001 | Mahalingam | |
| 6,348,971 B2 * | 2/2002 | Owa et al. ..................... | 358/1.15 |
| 2001/0017705 A1 * | 8/2001 | Hashizume et al. ........... | 358/1.9 |
| 2001/0043214 A1 * | 11/2001 | Nakatsuji et al. ............. | 345/471 |
| 2002/0032765 A1 | 3/2002 | Pezzutti | |
| 2002/0122199 A1 * | 9/2002 | Lomas et al. ................. | 358/1.14 |
| 2005/0005042 A1 * | 1/2005 | Fukunaga et al. ............. | 710/62 |
| 2005/0128501 A1 * | 6/2005 | Choi et al. ................... | 358/1.13 |

(Continued)

FOREIGN PATENT DOCUMENTS

| | | |
|---|---|---|
| EP | 0 858 027 A2 | 8/1998 |
| JP | 06-337765 A | 12/1994 |

(Continued)

OTHER PUBLICATIONS

Ken Slovak, Absolute Beginner's Guide to Microsft Office Outlook 2003, 2003, Que, pp. 385-422.*

(Continued)

*Primary Examiner* — Ming Hon
(74) *Attorney, Agent, or Firm* — Osha Liang LLP

(57) ABSTRACT

A print system includes a first printer and a print data output device that is communicably connected to the first printer. The print data output device is adapted to output to the first printer print data generated based on internal print data generated by any of a plurality of programs. The print data output device includes a second printer-retained information storage unit. The second printer-retained information storage unit obtains and stores the second printer-retained information that is stored in the second printer. The print data output device includes an intermediate data generation section that generates raster image data based on the internal print data and the second printer-retained information. The print data output device includes a print data generation unit that generates the print data used for causing the first printer to form an image based on the raster image data on an image recording medium. The print data output device is installed in a host computer by a method or a computer-readable program product. The method, or computer-readable program product causes the computer to execute, steps include installing a print data output program. The print data output program converts print data for causing a printer to be replaced to perform printing into print data for causing a replacement printer to perform printing.

17 Claims, 9 Drawing Sheets

(56) References Cited

U.S. PATENT DOCUMENTS

| | | | |
|---|---|---|---|
| 2005/0128514 A1* | 6/2005 | Wanda et al. | 358/1.15 |
| 2005/0225789 A1* | 10/2005 | Ferlitsch | 358/1.13 |
| 2006/0010137 A1* | 1/2006 | Johnson | 707/100 |

FOREIGN PATENT DOCUMENTS

| | | |
|---|---|---|
| JP | 08-328783 A | 12/1996 |
| JP | 10-312274 A | 11/1998 |
| JP | 11-184656 A | 7/1999 |
| JP | 2004-213264 A | 7/2004 |
| JP | 2004-252936 A | 9/2004 |
| WO | 2004/003866 A1 | 1/2004 |
| WO | 2004/074387 A2 | 9/2004 |

OTHER PUBLICATIONS

European Search Report for European Application No. 06114861.5-1245, mailed on Apr. 7, 2009 (4 pages).
European Search Report for European Application No. 06114861.5-1245, mailed on Jun. 22, 2009 (16 pages).
Office Action issued in the counterpart Japanese patent application No. 2005-163291 dated Jun. 8, 2010. 5 pages.
Office Action issued in the counterpart Japanese patent application No. 2005-163292 dated Jun. 8, 2010. 6 pages.
Office Action issued in Japanese patent application No. 2005-163292 dated Nov. 2, 2010 and an English translation thereof (6 pages).
Patent Abstracts of Japan, Publication No. 2004-252936, Publication Date Sep. 9, 2004 (1 page).

* cited by examiner

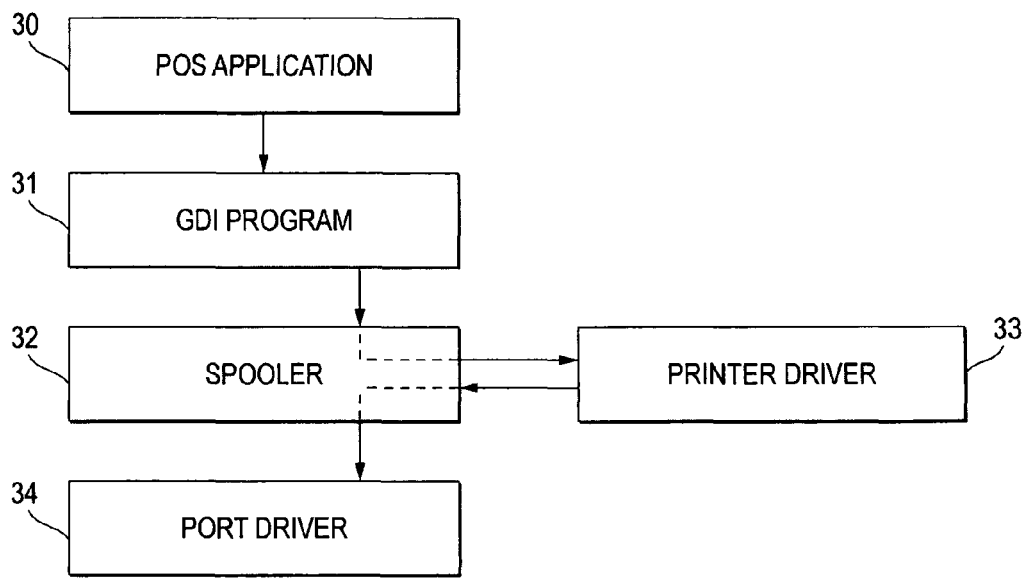

FIG. 6

| IDENTIFICATION DATA | PRINTER DRIVER | PORT |
|---|---|---|
| PRINTER A | PRINTER DRIVER OF PRINTER A | COM PORT 1 |
| PRINTER B | PRINTER DRIVER OF PRINTER B | USB PORT 1 |

FIG. 7

| IDENTIFICATION DATA | PRINTER DRIVER | PORT |
|---|---|---|
| PRINTER A | PRINTER DRIVER OF PRINTER B | USB PORT 1 |

PRINT SYSTEM

TECHNICAL FIELD

The present invention relates to a print system.

BACKGROUND

A commonly-known print system includes a computer that executes various types of application programs, and a printer; and causes the printer to produce a printout of documents and images prepared by the application programs. When replacing the printer of such a print system to another printer, there may arise a case where a difference arises between the printout produced by the printer that is replaced (hereinafter simply called a "pre-replacement printer") and the printout produced by the printer that is used after the replacement (hereinafter simply called a "post-replacement printer"). In such a case, in order to cause a printout of the post-replacement printer to reproduce a printout analogous to the printout produced by the pre-replacement printer, modifications have been made to specifications or settings of the application programs.

In order to obtain analogous printouts by a plurality of printers, computer programs (e.g., a printer driver or the like) compatible with each of the printers need to be installed in the computer, and the user must change settings such that the printer that the printout is directed to performs printing in accordance with the print command made by the application program. Thus, when using a plurality of printers and changing (switching) the printer that the printout is directed to involves consumption of the user's time and labor.

There may be a case where a data flow employed during printing varies from one application program to another. For example, in some application programs, printing process is performed through a printer driver. However, in other application programs, printing process is performed through a program other than the printer driver. Therefore, when the printer is changed as mentioned above, modifications must be added to the computer in conformity with the data flow of the application program. For example, a printer driver compatible with the post-replacement printer must be newly installed in the computer having installed therein an application program designed to perform the printing process through a printer driver. In the case of a computer having installed therein an application program to perform printing process through a program other than the printer driver, the program compatible with the post-replacement printer must be newly installed in the computer.

When the printer is changed as above, it is desirable that the user or a software maker of the application program is not required to make modifications to the specifications or settings of the application program. Further, it is desirable that modifications need to be made to the computer do not vary with the data flow of the application program that is employed during the printing process.

SUMMARY

A print system includes: a first printer; and a print data output device that is communicably connected to the first printer and outputs to the first printer print data generated based on internal print data generated by any of a plurality of programs, wherein the internal print data includes data for specifying at least one of the fonts that is stored in a second printer that is different from the first printer. The print data output device includes: a font image data storage unit that stores a font copy that is stored in the second printer as a font image data; a raster image data generation unit that generates raster image data based on the internal print data and the font image data; and a print data generation unit that generates the print data used for causing the first printer to form an image based on the raster image data on an image recording medium.

BRIEF DESCRIPTION OF THE DRAWINGS

In the accompanying drawings:

FIG. 2 is a view for describing operation of a host computer;

FIG. 3 is a view showing example printer information;

FIG. 6 is a view showing example printer information;

FIG. 7 is a view showing example printer information;

DETAILED DESCRIPTION

Embodiments of the present invention will be described in detail hereafter with reference to the drawings.

Figure 1:
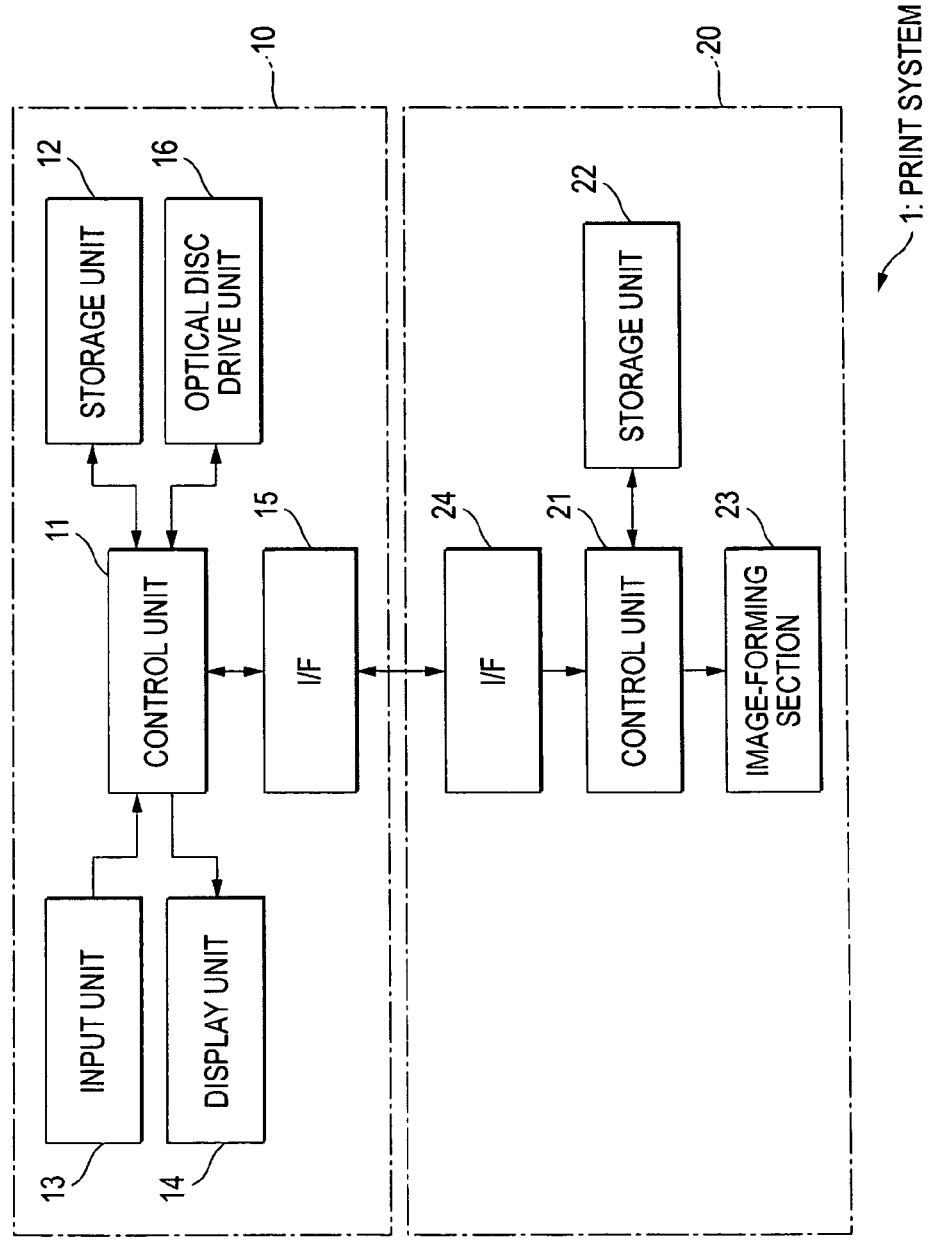
FIG. 1 is a view showing an entire configuration of a print system according to an embodiment of the present invention.

FIG. 1 is a view showing an entire configuration of a print system according to an embodiment of the present invention. As shown in FIG. 1, a print system 1 includes a host computer 10 (a print data output apparatus) and a printer 20.

As shown in FIG. 1, the host computer 10 includes a control unit 11, a storage unit 12, an input unit 13, a display unit 14, an interface (I/F) 15, and an optical disc drive unit 16.

The control unit 11 operates in accordance with an operating system and other programs, which are stored in the storage unit 12, thereby executing various information processing operations. The storage unit 12 is formed from a computer-readable information storage medium. For example, the storage unit 12 includes ROM (Read-Only Memory), RAM (Random Access Memory), and a hard disk drive unit. Programs to be executed by the control unit 11 are stored in the storage unit 12. The storage unit 12 also operates as working memory for storing various types of data required during the course of processing executed by the control unit 11.

In accordance with a command from the control unit 11, the optical disc drive unit 16 reads a program or data stored in an optical disc (an information storage medium); e.g., DVD-ROM or the like.

The input unit 13 includes an input device such as keyboard and mouse, and outputs to the control unit 11 data conforming to an input of operation performed by the user. A display unit 14 includes a display device such as liquid crystal display panel and cathode-ray tube, and displays information in accordance with the command input by the control unit 11.

The interface 15 is an interface for connecting various peripheral devices or a data storage medium (a memory card or the like) to the host computer 10. The interface 15 outputs, to the control unit 11, data input by the peripheral devices or the like. In accordance with the command input from the control unit 11, the interface 15 outputs various sets of data to the peripheral devices, or the like. The interface 15 is equipped with one or a plurality of connection ports complying with; e.g., RS-232C interface standards or one or a plurality of connection ports complying with a USB (Universal Serial Bus) interface standards. In the following descriptions, a connection port complying with the RS-232C interface standards is described as a "COM port," and a connection port complying with the USB interface standards is described as a "USB port."

The host computer 10 is connected to the printer 20 through the interface 15 so that data can be exchanged between the computer and the printer. As shown in FIG. 1, the printer 20 includes a control unit 21, a storage unit 22, an image-forming section 23, and an interface (I/F) 24.

The control unit 21 controls the entirety of the printer 20. The storage unit 22 includes ROM or RAM, and stores various programs and data, which are required for performing the printing process. The interface 24 receives the data transmitted from the host computer 10, and outputs the thus-received data to the control unit 21. The printer 20 is provided with, for example, a COM port and a USB port, as the interface 24. The image-forming section 23 generates image data based on the data input by the control unit 21, and prints out an image on an image recording medium, such as a print sheet, in accordance with the image data.

For example, the printer 20 stores font image data (printer-retained information) in the storage unit 22; receives from the host computer 10 command data representing specifics of a document (e.g., command data representing character strings), command data representing types of fonts, or the like; generates raster image data based on the command data; and forms an image on the image recording medium in accordance with the raster image data. For example, the printer 20 receives from the host computer 10 raster image data of predetermined data format (more specifically, e.g., command data showing color information about respective pixels forming an image), and forms an image in accordance with the raster image data on the image recording medium.

The printer 20 is provided with an automatic cutting mechanism (not shown). The printer 20, when a command data which instructs cutting of an image recording medium is received, cuts the image recording medium at a given position in a given mode instructed by the command data.

In one or more embodiments, Windows OS (Registered Trademark) manufactured by Microsoft Corporation is installed in the host computer 10 as an operating system. A POS (Point of Sales) application program (hereinafter described as a "POS application") is also installed in the host computer 10. The POS application is provided with a receipt (sales slip) creation function. The printer 20 is used for printing a receipt image created by the POS application.

Operation of the host computer 10 when performing a printing process of the receipt image will now be described. FIG. 2 is a view for describing the printing process of the receipt image. In the following description, it is assumed that a printer A is connected, as the printer 20, to the COM port 1 of the host computer 10. The printer A stores font image data in the storage unit 22; receives from the host computer 10 command data representing specifics of a document and the like, or command data and the like representing a type font; generates raster image data based on these sets of command data; and forms the raster image data on an image recording medium. A printer driver (a print data output program) compatible with the printer A is installed in the host computer 10.

As shown in FIG. 2, when the POS application 30 issues a command to print the receipt image, a GDI (Graphic Device Interface) program 31 generates meta data representing the command to render the receipt image. The GDI program 31 is a program provided as a part of the operating system, and the meta data is independent from a device (e.g., the printer).

The meta data generated by the GDI program 31 are supplied to a printer driver 33 through a spooler 32. Printer information about the printer 20, such as that shown in FIG. 3, is stored in the host computer 10. As illustrated in FIG. 3, the printer information includes an "identification data" field, a "printer driver" field, and a "port" field. The "identification data" field stores identification information used for identifying a combination of a printer driver and a port; for example, character strings based on the model name of the printer 20 are stored. The "printer driver" field stores information used for specifying a printer driver; for example, the name of a printer driver is stored. The "port" field stores information used for specifying the port connected to the printer 20. In the embodiment shown in FIG. 3, only printer A is connected to the host computer 10. When a plurality of printers 20 are connected to the host computer 10, a plurality of pieces of printer information about the respective printers 20 are stored. In one or more embodiments, one set of "identification data" is associated with the POS application 30. The meta data created by the GDI program 31 are supplied to the printer driver 33 assigned to the "identification data" associated with the POS application 30.

The printer driver 33 converts the meta data into print data (data dependent on a device) compatible with the printer A. For example, command data used for causing the printer A to create a receipt image on an image recording medium and command data used for controlling the mechanism of the printer A (e.g., command data used for issuing a command to cut an image recording medium) are generated based on the meta data.

The print data generated by the printer driver 33 are temporarily stored in the storage unit 12 by a spooler 32. The spooler 32 sequentially transmits the print data to the printer 20 while monitoring the status of the printer 20. Specifically, the print data are output from a port (see FIG. 3) corresponding to the "identification data" associated with the POS application 30, by way of a port driver 34, and are supplied to the printer 20 (e.g., the printer A).

Figure 4:
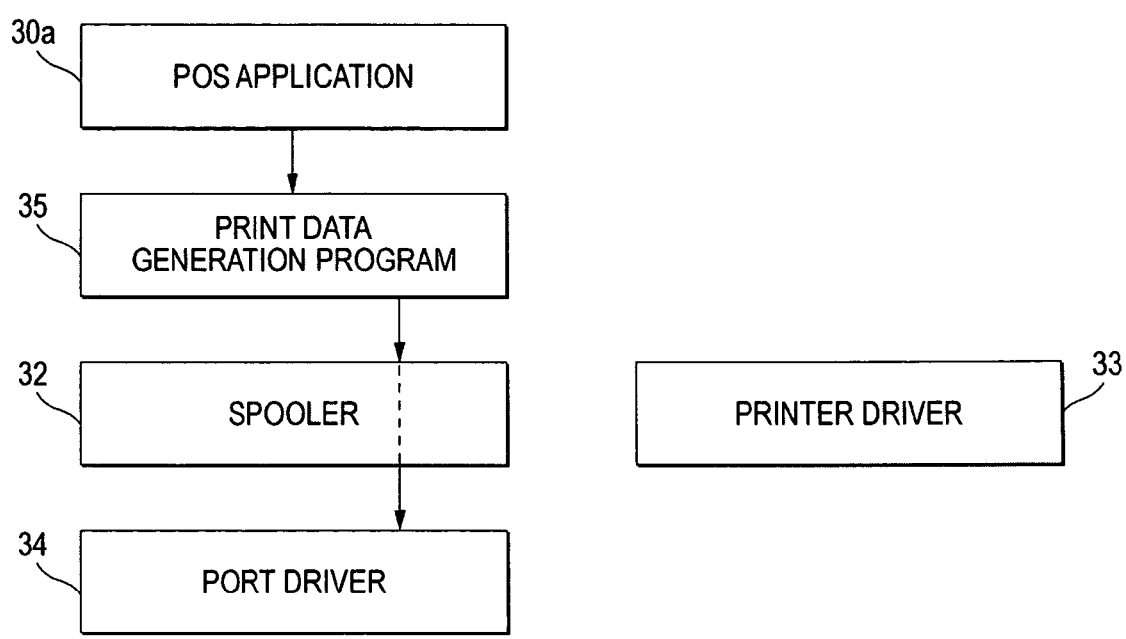
FIG. 4 is a view for describing operation of the host computer.

There may also be a case where the print data compatible with the printer A are generated by a program other than the printer driver 33. FIG. 4 shows operation of the host computer 10 in such a case. Those elements which operate in the same manner as do the elements shown in FIG. 2 are assigned the same reference numerals, and repeated explanations of their operations are omitted.

As shown in FIG. 4, when the POS application 30a has issued a command to print a receipt image, a print data generation program 35 generates print data compatible with the printer A. The print data generation program 35 is a program provided as a part of, e.g., the POS application 30a.

The print data generated by the print data generation program 35 are supplied to the printer 20 (the printer A) by way of the spooler 32 and the port driver 34 without involvement of the printer driver 33. One port is allocated to the POS application 30a or the print data generation program 35. For example, as a result of one set of "identification data" (see FIG. 3) being associated with the POS application 30a or the print data generation program 35, the one port is associated with the POS application 30a or the print data generation program 35. The print data generated by the print data generation program 35 are output from the port, which is allocated to the POS application 30a or the print data generation program 35, and supplied to the printer 20 (e.g., is the printer A).

In the print system 1 that is described above, when the printer 20 directed to perform the printing is changed from the printer A (the second printer) to a printer B (a first printer) that receives raster image data of a predetermined data format and forms the raster image data on the image recording medium, a program for causing the printer B to print the receipt image is required. At this time, when the POS application 30 causes the printer B to perform printing, the printer driver 33 compatible with the printer B is usually required. When the POS application 30a causes the printer B to perform printing, the print data generation program 35 compatible with the printer B is usually required. Next, a technique is described for enabling, in such a case, initialization of the utilization of the printer B without the necessity of preparing different programs for the respective POS applications 30, 30a.

In the print system 1, when the printer 20 directed to the perform the printing is changed from the printer A to the printer B, there may arise a case where a difference exists between a printout produced by the printer A and that produced by the printer B. There will also be described a technique for enabling, in such a case, the printer B to produce a printout analogous to that produced by the printer A, without making modifications to specifications and settings of the POS application.

First procedures will be described that are performed when the printer 20 connected to the host computer 10 is changed from the printer A to the printer B. The following descriptions are based on the assumption that, in this exemplary embodiment, the printer B is connected to the "USB port 1" of the host computer 10.

When the printer 20 connected to the host computer 10 is changed from the printer A to the printer B, the user disengages the connection between the host computer 10 and the printer A, and an optical disc (an install disk) where the printer driver of the printer B is stored is loaded into the optical disc drive unit 16. Subsequently, the user connects the printer B to the "USB port 1" of the host computer 10.

Figure 5:
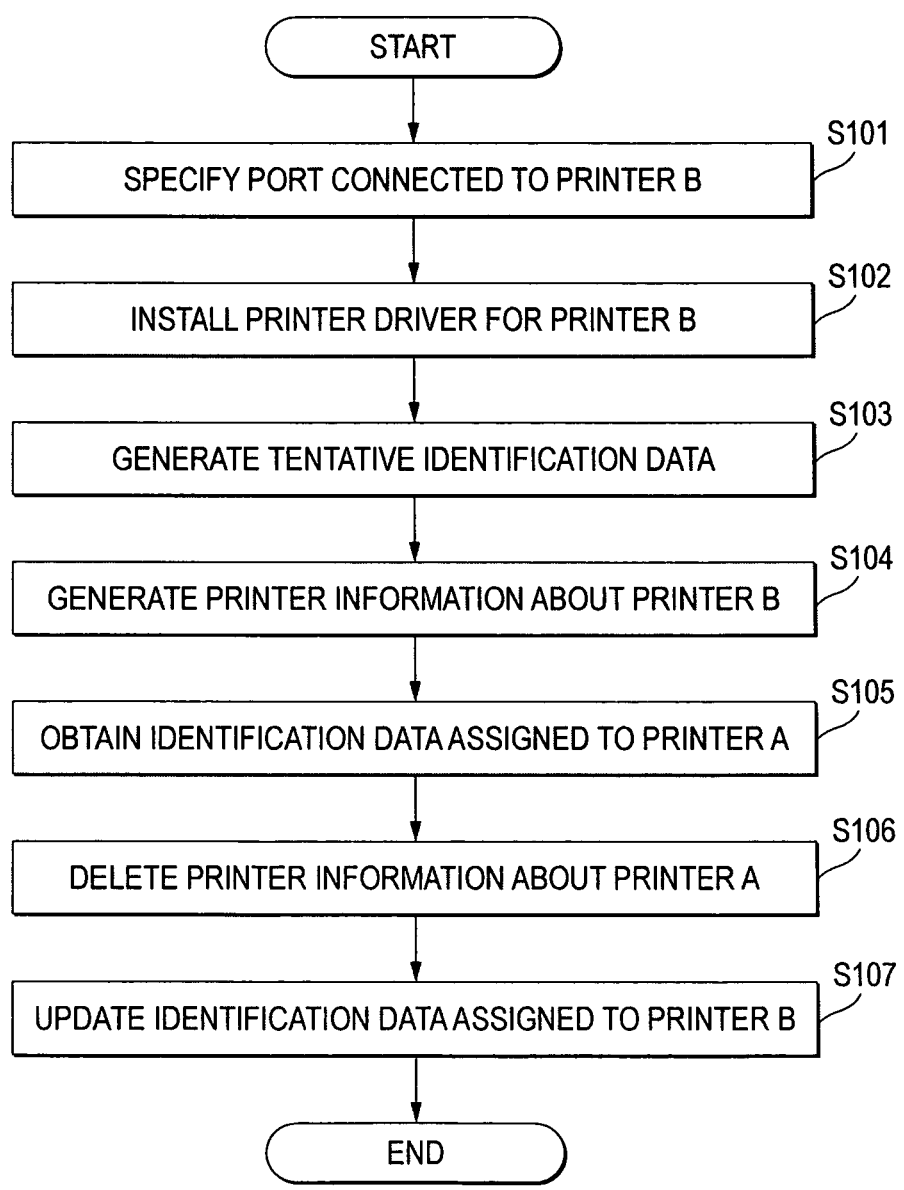
FIG. 5 is a flowchart showing example install processing.

When the printer B is detected as connected to the "USB port 1" of the host computer 10, the host computer 10 performs installation processing such as that shown in FIG. 5. Through install processing shown in the drawing, processing pertaining to steps S101 to S104 is performed by the operating system. Further, processing pertaining to steps S105 to S107 is implemented by means of reading a predetermined program stored in the install disk and the control unit 11 executing the thus-read program.

As shown in FIG. 5, the port connected to the printer B is first specified (S101). Next, the printer driver compatible with the printer B is read from the install disk, and the thus-read printer driver is installed in the host computer 10 (S102). The installed printer driver comprises the main body of the printer driver (equivalent to the printer driver 33) used for converting the meta data generated by the GDI program 31 into print data compatible with the printer A; a language monitor program; and a print data conversion program. The language monitor program and the print data conversion program are for converting the print data compatible with the printer A into print data compatible with the printer B. These programs will be described in detail below with reference to FIGS. 9 and 10.

Next, tentative identification data are generated (S103) The tentative identification data are generated from the model name of, e.g., the printer B. Next, printer information about the printer B is generated, and the thus-generated printer information is additionally registered (S104). The tentative identification data generated in S103 are stored in the "identification data" field of the printer information about the printer B. Information indicating the printer driver installed in S102 is stored in the "printer driver" field. Moreover, information indicating the port detected in S101 is stored in the "port" field. Consequently, the printer information is updated as shown in FIG. 6. Processing pertaining to S103 and processing pertaining to S104 may be performed integrally or separately.

Next, the "identification data" compatible with the printer A are obtained (S105). Specifics of the "identification data" field of the printer information about the printer A are obtained. Next, the printer information about the printer A is deleted (S106). Finally, specifics of the "identification data" field of the printer information about the printer B are updated to the identification data obtained in S105 (S107). As a consequence, the printer information is updated as shown in FIG. 7. Specifically, the printer driver of the printer B and the port connected thereto are associated, in place of the printer driver of the printer A and the port connected thereto, with the "identification data" assigned to the printer A. Put another way, the printer information, where the printer driver of the printer B is associated with the port connected thereto, is stored as printer information about the printer B in the "identification data" assigned to the printer A.

Figure 8:
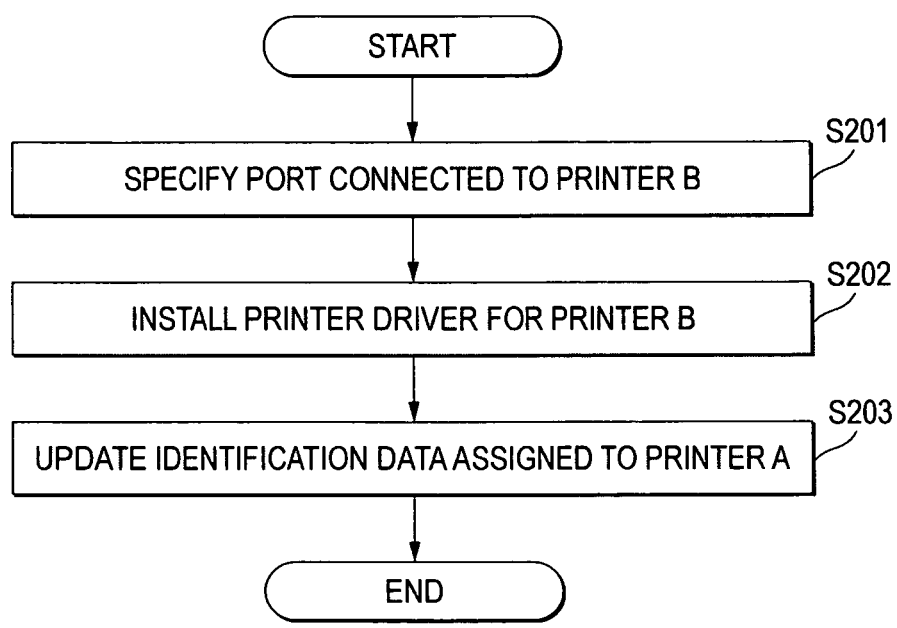
FIG. 8 is a flowchart showing another example install processing operation.

When the printer B is connected to a port (e.g., the "COM port 1") other than the "USB port" of the host computer 10, procedures, which will be described below, are carried out. Specifically, the user disengages the connection of the host computer 10 with the printer A. After the optical disc (the install disk), wherein the printer driver of the printer B and an install program of the printer driver are stored, is loaded in the optical disc drive unit 16, the install program is executed. FIG. 8 is a flowchart showing install processing to be executed by the install program.

As shown in FIG. 8, the port connected to the printer B is first specified (S201). The port connected to the printer B may be automatically detected, or may be input by the user. Next, the printer driver compatible with the printer B is installed (S202). The printer driver to be installed is analogous to the printer driver described in connection with S102 shown in FIG. 5. Next, the printer information about the printer A is updated (S203). Specifically, specifics of the "printer driver" field in the printer information about the printer A are updated so as to indicate the printer driver installed in S202. Specifics of the "port" field are updated so as to indicate the port specified in S201. As shown in FIG. 7, the printer information is updated. Specifically, the printer information, where the printer driver of the printer B and the port connected thereto are associated with each other, is generated as printer information about the printer B in the "identification data" assigned to the printer A.

In S202, only the language monitor program and the print data conversion program may be installed. In this case, in S203, only the specifics of the "port" field may be updated. For example, it may be better to update only the specifics of the "port" field in the host computer 10 that executes only the POS application 30a. At this time, the port associated with the POS application 30a or the print data generation program 35 is updated to the port specified in S201.

According to the install processing (see FIG. 5 or 8) described above, the newly-installed printer driver of the printer B and the port connected thereto are automatically associated with the "identification data" originally assigned to the printer A. Therefore, the printer B produces a printout of the receipt image even when the user does not make any modifications to settings of a destination of printout, or the like, in the POS application.

Figure 9:
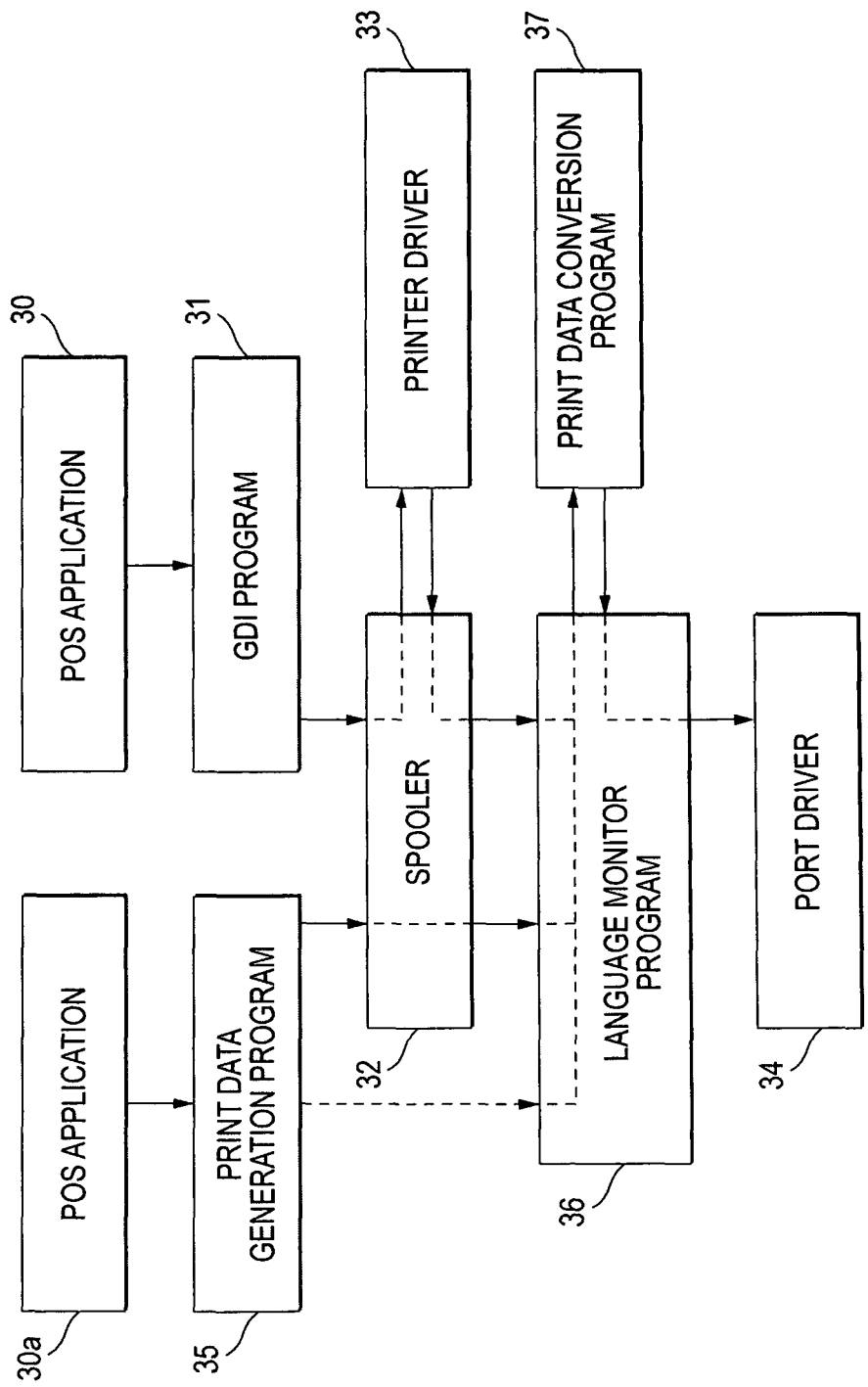
FIG. 9 is a view for describing operation of the host computer.

Next, operations will be described that are performed by the host computer 10 when the receipt image is printed after install processing (see FIG. 5 or 8) is executed. FIG. 9 is a view for describing the operation. Those operations which are the same as those shown in FIGS. 2 and 4 are assigned the same reference numerals, and their explanations are omitted. FIG. 9 shows the POS application 30 and the POS application 30a. However, at least one of the application programs is installed in the host computer 10.

As shown in FIG. 9, when the POS application 30 issues a command to print a receipt image, the GDI program 31 generates the meta data that represent a command to render the receipt image. The meta data generated by the GDI program 31 are supplied to the printer driver 33 by way of the print spooler 32. The printer driver 33 indicates the "main body of a printer driver" included in the printer driver installed in S102 in FIG. 5 or S202 in FIG. 8. The printer driver 33 converts the meta data into print data compatible with the printer A. In contrast, when the POS application 30a issues a command to print the receipt image, the print data generation program 35 generates the print data compatible with the printer A.

The print data (internal print data) generated by the printer driver 33 or the print data generation program 35 are supplied to a language monitor program 36 by way of the spooler 32. The print data generated by the print data generation program 35 may be supplied from the print data generation program 35 directly to the language monitor program 36. The language monitor program 36 monitors whether or not the print data is supplied. When it is detected that the print data is supplied, the print data are supplied to a print data conversion program 37. The language monitor program 36 is used for receiving status information about the printer 20 supplied from the printer 20 by way of the port driver 34, and supplying the thus-received status information to a predetermined program (e.g., a printer status reference program or the like) The language monitor program 36 and the print data conversion program 37 may be provided integrally or separately.

The print data conversion program 37 converts the print data, which is generated by the printer driver 33 or the print data generation program 35, into the print data compatible with the printer B. For example, "command data used for causing the printer A to form a receipt image on an image recording medium" included in the print data generated by the printer driver 33 or the print data generation program 35 are converted into "command data used for causing the printer B to form a receipt image on an image recording medium." Further, for example, "command data used for controlling the mechanism of the printer A" are converted into "command data used for controlling the mechanism of the printer B in the same manner." The print data generated by the print data conversion program 37 are output from a port (see FIG. 7) associated with the "identification data" assigned to the POS application 30 or the port associated with the POS application 30a or the print data generation program 35, by way of the language monitor program 36 and the port driver 34, and the thus-output print data are supplied to the printer 20 (printer B).

The function performed by the print data conversion program 37 will now be described in detail.

Figure 10:
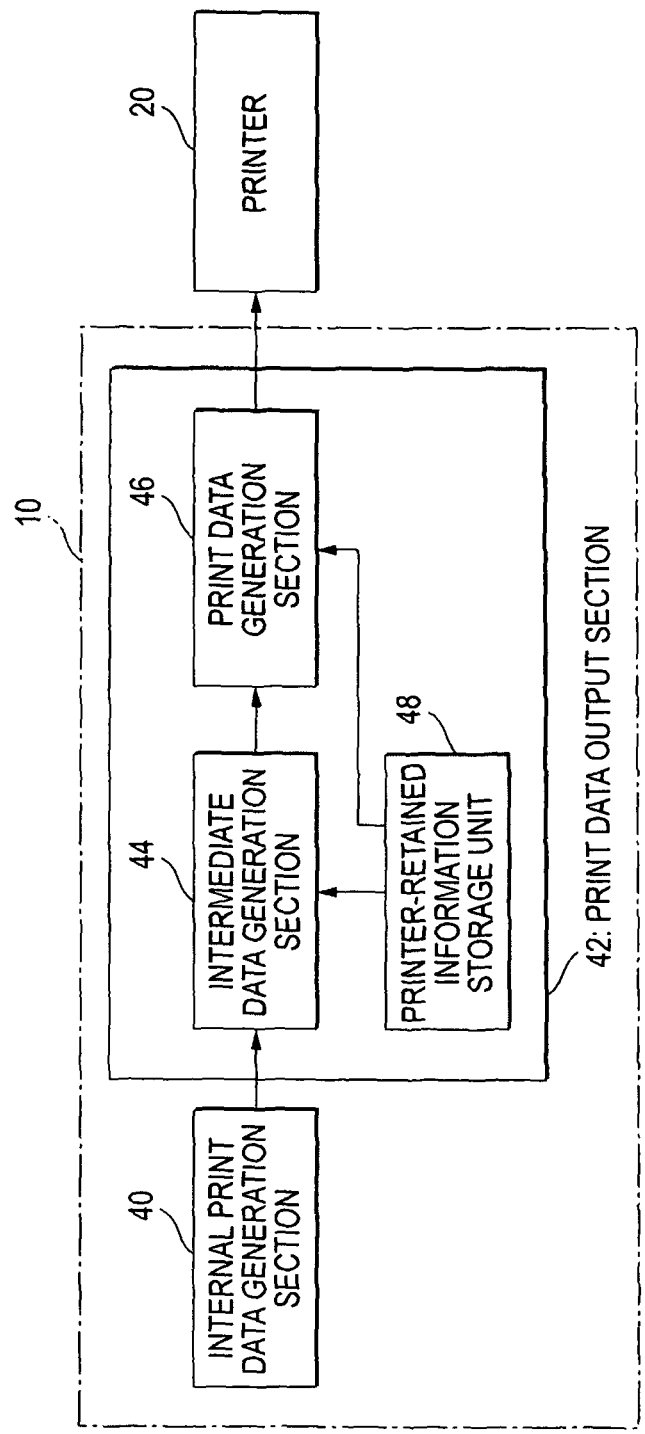
FIG. 10 is a functional block diagram of the print system according to an embodiment of the present invention.

FIG. 10 is a functional block diagram mainly showing a functional block pertaining to an embodiment of the present invention among the functional blocks embodied by the host computer 10 after execution of install processing (see FIG. 5 or 8). As illustrated, the host computer 10 includes an internal print data generation section 40 and a print data output section 42.

[1. Internal Print Data Generation Section]

The internal print data generation section 40 generates the print data compatible with the printer A as internal print data. The internal print data include command data used for specifying at least one of fonts stored in the printer A. The internal print data also include command data (mechanism control data) used for controlling the mechanism of the printer A. For example, the internal print data include command data used for causing the printer A to cut an image recording medium. The internal print data generation section 40 is realized as a result of the control unit 11 executing the printer driver 33 or the print data generation program 35.

Figure 11:
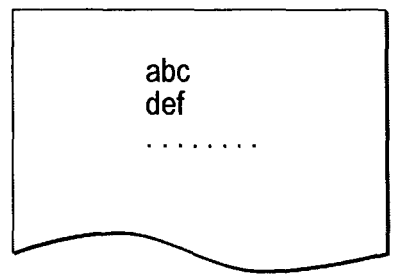
FIG. 11 is a view showing an example receipt image.

For example, when a receipt image as shown in FIG. 11 is printed, the internal print data generation section 40 generates command data used for commanding the printer A to commence printing, and the thus-generated print data are supplied to the print data output section 42. Subsequently, command data; e.g., "ESC RS F 0," used for instructing the printer A to use a font type, are generated, and the thus-generated command data are supplied to the print data output section 42. Moreover, there are also generated command data; e.g., "ESC d 3," used for instructing the printer A the position where an image recording medium is to be cut and the cutting mode to use, and the generated command data are supplied to the print data output section 42. Subsequently, command data; e.g., "a," "b," "c," LF or "d," "e," "f," LF, for instructing the printer A specifics of a text and a print line feed pertaining to each line are sequentially generated, and the thus-generated command data are supplied to the print data output section 42. In addition, command data, or the like, used for instructing, e.g., a print color, are generated as required, and are supplied to the print data output section 42. Finally, command data used for commanding the printer A to complete printing operation are generated, and the thus-generated data are supplied to the print data output section 42. In the above descriptions, "ESC RS F 0" designates command data used for specifying a font type of ID "0." "LF" designates command data used for instructing a line feed. Further, "ESC d 3" designates command data used for commanding the printer to effect partial cutting (cutting with one point being left uncut) by feeding a sheet up to a cutting position.

[2. Print data output section]

The print data output section 42 generates print data compatible with the printer B from the internal print data generated by the internal print data generation section 40, and outputs the thus-generated print data. In one or more embodiments, the print data output section 42 is comprised of the language monitor program 36 and the print data conversion program 37.

As shown in FIG. 10, in one or more embodiments, the print data output section 42 comprises an intermediate data generation section 44, a print data generation section 46, and a printer-retained information storage unit 48.

[2-1. Printer-Retained Information Storage Unit]

In one or more embodiments, the printer-retained information storage unit 48 is comprised of the storage unit 12. For example, the printer-retained information storage unit 48 (font image data storage unit) stores font image data conforming to the font stored in the storage unit 22 of the printer A. For example, when the printer A performs printing at a predetermined resolution and stores font image data formed from a bitmap font conforming to the resolution, the printer-retained information storage unit 48 stores font image data formed from an analogous bitmap font.

Moreover, for example, the printer-retained information storage unit 48 stores printer-retained information (information retained by the second printer) based on various types of information retained in the printer A other than the font image data, as well. For example, the printer A is equipped with dip switches and memory switches. In a case where printing is performed based on settings (the density of a print, or the like) of the dip switches or the memory switches, data representing settings of the dip switches or the memory switches of the printer A are stored in the printer-retained information storage unit 48. For example, when the printer A has received registration instruction command data pertaining to logo image data, the storage unit 22 stores the logo image data. When the printer A has received print instruction command data pertaining to logo image data and when the logo image data stored in the storage unit 22 are formed on an image recording medium, the logo image data retained in the printer A are stored in the printer-retained information storage unit 48.

Install processing (see FIG. 5 or FIG. 8) is caused to be performed with the printer A being connected. Various types of information retained in the printer A may be automatically obtained through install processing, and written into the printer-retained information storage unit 48.

As in the case of the user registering logo image data into the printer A, it may also be possible to allow the logo image data to be registered in the printer-retained information storage unit 48. Specifically, the internal print data generation section 40 may generate the registration instruction command data pertaining to the logo image data. When the print data output section 42 (the intermediate data generation section 44) has received the registration instruction command data, the logo image data may be stored in the printer-retained information storage unit 48.

For example, the printer-retained information storage unit 48 stores the printer-retained information (information retained by the first printer) based on the various types of information retained in the printer B. For example, the printer-retained information storage unit 48 stores data representing settings of the dip switches or the memory switches of the printer B. The printer-retained information storage unit 48 may be caused to automatically obtain the various types of information from the printer B at a predetermined timing, and to store the printer-retained information pertaining to the printer B.

[2-2. Intermediate Data Generation Section]

The intermediate data generation section 44 generates intermediate data from the internal print data generated by the internal print data generation section 40. More specifically, the intermediate data generation section 44 generates raster image data pertaining to a receipt image, which is an object of printing, based on the internal print data generated by the internal print data generation section 40, the font image data stored in the printer-retained information storage unit 48, and the font-retained information which pertains to the printer A and is stored in the printer-retained information storage unit 48. The intermediate data generation section 44 generates intermediate control data, which represent control details of the command data in a predetermined format, in connection with at least a portion of the command data included in the internal print data generated by the internal print data generation section 40.

Specifically, the intermediate data generation section 44 interprets command data sequentially supplied from the internal print data generation section 40, and generates raster image data and intermediate control data. For example, upon receipt of the command data used for instructing the printer A the type font, the intermediate data generation section 44 generates intermediate control data; e.g., "Font=. . ." Moreover, for example, upon receipt of command data representing a command to cut an image recording medium, the intermediate data generation section 44 generates intermediate control data; e.g., "Feed to cutter=True;Cut percentage= 50%; . . . ," For example, upon receipt of command data used for instructing the printer A print details and line feed of a print for each line, the intermediate data generation section 44 generates raster image data for each line. The raster image data are generated from, e.g., the intermediate control data pertaining to the type font, the font image data stored in the printer-retained information storage unit 48, and printer-retained information (e.g., the density of a print) pertaining to the printer A. For example, upon receipt of the print instruction command data pertaining to logo image data, the intermediate data generation section 44 reads the logo image data from the printer-retained information storage unit 48, to thus generate raster image data on the basis of the logo image data. The intermediate data (the raster image data and the intermediate control data) generated by the intermediate data generation section 44 are sequentially supplied to the print data generation section 46.

[2-3. Print Data Generation Section]

Based on the intermediate data generated by the intermediate data generation section 44, the print data generation section 46 generates print data compatible with the printer B. The print data generation section 46 further generates print data based on the printer-retained information stored in the first printer-retained information storage unit 48. More specifically, the print data generation section 46 generates command data used for causing the printer B to form on the image recording medium the raster image data generated by the intermediate data generation section 44. Namely, the print data generation section 46 generates, in the data format compatible with the printer B, command data used for showing the coloring information pertaining to respective pixels which form an image. Moreover, the print control data generation section 46 generates command data for causing the printer B to control specifics indicated by the intermediate control data generated by the intermediate data generation section 44.

Specifically, the print data generation section 46 generates command data; e.g., "ESC * r A," which are used for commanding the printer B to start printing. For example, the print data generation section 46 generates command data used for causing the printer B to cut the image recording medium at a cut position, and a cut mode, which are indicated by the intermediate control data. For example, there are generated command data; e.g., "\xlbd3" for causing the printer B to feed a sheet to the cut position and to partially cut the sheet. For example, upon receipt of the raster image data from the intermediate data generation section 44, the print data generation section 46 sequentially generates command data used for instructing the printer B color information about respective pixels in each line of dots, based on the raster image data. For example, command data, such as "b\x25\x01 . . . " are generated for each line of dots. Finally, the print data generation section 46 generates command data; e.g., "ESC * r B" which are used for commanding the printer B to complete printing. The command data sequentially generated by the print data generation section 46 are sequentially output as print data from the port (USB port 1) assigned to the POS application, and the thus-output print data are transmitted to the printer 20 (the printer B).

The printer 20 (printer B) receives and interprets the command data sequentially transmitted from the print data output section 42, and performs formation of the receipt image on an image recording medium, cutting of the image recording medium, and the like, in accordance with the command data.

As described above, the print system 1 of embodiments of the present invention is caused to first generate print data compatible with the printer A which stores the font data into the storage unit 22; which receives command data including data showing specifics of documents, data instructing the type font, and the like; which generates raster image data on the basis of these sets of data; and which forms the raster image data on an image recording medium. The information retained in the printer A (the font image data, settings of the dip switches, and settings of the memory switches, and the like) is stored in the print system 1. Based on the information and the print data compatible with the printer A, the raster image data are generated. Specifically, the host computer 10 generates raster image data analogous to the raster image data which are to be generated when the printer A has received analogous print data. Print data used for causing the printer B to form the raster image data on the image recording medium are generated and output to the printer B. Therefore, according to the printer system 1, the printer B can reproduce a printout analogous to the printout produced by the printer A, by means of the printout produced by printer B. For example, even when the printer B is a printer (e.g., a GDI printer or the like) which is less expensive than the printer A, the printer B can produce a printout equivalent to that produced by the printer A. Specifically, the print system 1 enables a comparatively-inexpensive printer to materialize functions equivalent to the print functions (print features) pertaining to a more expensive printer.

The print system 1 is configured such that the above-described reproduction of an analogous printout using the language monitor program 36 and the print data conversion program 37, which are additionally installed. Accordingly, the print system 1 can perform reproduction of an analogous printout without making modifications to the POS application programs 30, 30a. The reproduction of an analogous printout does not require preparing different programs for the POS application programs 30, 30a.

When converting the print data compatible with one printer (the printer A) into print data compatible with another printer (the printer B), the print system 1 is arranged to generate intermediate data of a predetermined data format from the print data compatible with one printer, and to generate the print data compatible with the other printer from the intermediate data. For example, in a case where a plurality of printers are changed (replaced), when print data compatible with one printer are converted directly into print data compatible with another printer, a print data conversion module must be prepared for each combination of printers. In contrast, according to the present embodiment, the only requirement is to prepare a conversion module for converting print data into intermediate data for each printer. For example, when a printer of new specifications is provided, the only requirement is to prepare a conversion module for converting print data compatible with the new printer into intermediate data. In short, a conversion module, which converts print data into print data compatible with the new printer, does not need to be provided for each of the existing printers.

The present invention is not limited to the embodiments described above.

For example, the operating system executed by the host computer 10 is not limited to Windows OS (Registered Trademark) manufactured by Microsoft Corporation. Moreover, the application program executed by the host computer 10 is not limited to the POS application programs 30, 30a. Specifically, an object to be printed by the printer 20 is not limited to the receipt image created by the POS application programs 30, 30a. A document or image created by another application program may also be the object to be printed.

For example, the above descriptions have mentioned that the host computer 10 and the printer 20 are connected together by way of a serial cable or a USB cable. However, the host computer 10 and the printer 20 may be connected by way of a communications network such as a LAN (Local Area Network) or the like. In this case, the interfaces 15 and 24 may be configured as communications interfaces used for establishing a connection with the communications network.

For example, the printer driver installed in S102 in FIG. 5 or S202 in FIG. 8 may include a print data conversion program for converting the print data compatible with the printer A into print data compatible with a printer other than the printer B, as well as the print data conversion program for converting the print data compatible with the printer A into the print data compatible with the printer B. In this case, information indicating which one of the conversion programs is used is stored in the storage unit 12 (e.g., a hard disk drive), and conversion of print data may be performed by means of the conversion program indicated by the information.

For example, a plurality of types of print data conversion programs are stored in advance in the install disk. In this case, during install processing (see FIGS. 5 and 8), the user may be prompted to enter the type (model) of a pre-/post-replacement printer, or the type (model) of a pre-/post-replacement printer may be obtained automatically. The print data conversion program compatible with the pre-/post-replacement printer may be installed in the host computer 10.

Alternatively, for example, the internal print data generation section 40 and the print data output section 42 may be embodied by a program called by a designation other than the "printer driver." Further, the print data output section 42 may also be realized by a program (e.g., a "port emulator" or the like) called by a designation other than the "language monitor program."

As described above, there is provided a print system, wherein when a printer used for producing a printout of a document, an image, or the like, prepared by an application program is changed to another printer, the post-replacement printer can produce a printout analogous to that produced by the pre-replacement printer; and wherein the post-replacement printer can be made to produce an analogous printout while eliminating the necessity for making modifications to specifications or settings of the application program and preventing the modifications to be made to a computer from varying with a data flow of the application program employed during printing.

In one or more embodiments, various other printer-retained information can be stored as would be clearly understood by those skilled in the art. Some examples of information typically retained by a printer include one or more of the following.

"Zero style" which allows selection of the font shape for character "0" (a user can select "Normal 0" or "0 with slash"). "Code page" which is a table for data regarding which font shape should be assigned to each character code (0-255). Printers have many code tables to conform the user's language environment.

"International Character Set" which allows setting of the character code for assigning specific character font data. "Top search" which allows setting of the printing behavior for the starting position of printing. Specifically, printers typically have a "black marked" paper setting which causes the printer to automatically feed a paper roll to the next position of a black mark after printing. Alternatively, in some printers, there is a blank space of the receipt and a "Setting of reverse feed length" allows this blank space length to be set. Usually, the blank space length is set to 12-15 mm and is adaptable for a difference between a position of a cutter unit and that of a printing head in the printer. "Printing speed" allows setting of the printing speed of the printer. Print quality depends on printing speed. "Printing density" allows setting of the printing density to meet specifications for the thermal paper being printed on.

"Printing column number" allows setting of the number of characters per line.

"Paper feed pitch" allows setting of paper feed pitch at the usual "Line Feed" action when a LF code is received from the computer. Typically, a printer is able to be set at 2 mm Feed/line or at 3 mm Feed/line.

"Printing area" (width) allows selection of the appropriate type of paper width for the printer. Typically, the factory default setting for paper width is 72 mm, however, typical printers can use 80 mm width, 72 mm width, or 56 mm width, and this setting allows for the correction of the paper width when a user is not using default paper. According to embodiments of the present invention, there is provided one or more of the following configurations.

(1) A print system in accordance with one embodiment of the present invention is characterized by a print system including: a first printer; and a print data output device that is communicably connected to the first printer and outputs to the first printer print data generated based on internal print data generated by any of a plurality of programs, wherein the internal print data includes data for specifying at least one of the fonts that is stored in a second printer that is different from the first printer, and wherein the print data output device includes: a font image data storage unit that stores a font copy that is stored in the second printer as a font image data; a raster image data generation unit that generates raster image data based on the internal print data and the font image data; a print data generation unit that generates the print data used for causing the first printer to form an image based on the raster image data on an image recording medium; and an output unit that outputs the print data generated by the print data generation unit to the first printer.

(2) A computer-readable program product for causing a computer to function as a print system that outputs to a first printer print data based on internal print data generated by any of a plurality of programs and include data used for specifying at least one of fonts stored in a second printer different from the first printer, and causes the first printer to produce a printout based on the print data, the program product causing the computer to perform procedures including: a font image data storage unit that stores a font copy stored in the second printer as a font image data; a raster image data generation unit that generates a raster image data from the internal print data and the font image data; a print data generation unit that generates the print data used for causing the first printer to form an image on an image recording medium based on the raster image data; and an output unit that outputs the generated print data to the first printer.

The information storage medium of the present invention is a computer-readable information storage medium where the programs are stored.

(3) A computer-readable installation program product for causing a computer to install therein a second print data output program, the computer including program storage unit that stores one or a more print data output program including the first print data output program, wherein the computer further includes: an execution unit that executes an application program; an identification information storage unit that identifies the print data output program and stores one or more identification information in association with each print data output program; a storing unit that stores at least one identification information in association with the application program; and an output unit that outputs the print data that corresponds to the application program by the print data output program identified by the identification information that is associated with the application program, and wherein the installation program product causes the computer to execute procedures including: storing the second print data output program into the program storage unit; and updating stored information in the identification information storage unit by associating the identification information that is associated with the first print data output program with the second print data output program in place of the first print data output program.

The information storage medium in accordance with one embodiment of the present invention is a computer-readable information storage medium where the program is stored.

(4) A print system including a first printer, and a print data output device which is communicably connected to the first printer and outputs to the first printer print data based on internal print data generated by any of a plurality of programs. The internal print data include data used for specifying at least one of printer-retained information stored in a second printer that is different from the first printer. Further, the print data output device stores printer-retained information stored in the second printer. The print data output device also generates raster image data on the basis of the internal print data and the printer-retained information, and generates the print data used for causing the first printer to form the raster image data on an image recording medium. The generated print data are output to the first printer. According to the configuration, when a printer used for producing a printout of a document or an image created by an application program is changed to another printer (a first printer) from a "printer (a second printer) which stores font image data and produces a print out from the font image data," the printout of the first printer can be made to reproduce a printout analogous to that produced by the second printer. The reproduction of such an analogous printout can be fulfilled without involvement of a necessity for making modifications to specifications and settings of the application program and modifications to a data flow of the application program.

The printer-retained information may include information related to a font that is stored in the second printer.

The font stored in the second printer may be a bitmap font.

The second printer may be a printer which forms image data on an image recording medium at a predetermined resolution; and the font stored in the second printer may also be a font conforming to the predetermined resolution.

The print data output device may further include means for storing second printer-retained information based on information retained in the second printer; and the raster image data generation unit may further generate the raster image data on the basis of the second printer-retained information.

The print data output device may further include means for storing first printer-retained information based on information retained in the first printer; and the print data generation unit may further generate the print data on the basis of the first printer-retained information.

The internal print data may include mechanism control data used for controlling a mechanism of the second printer; and the print data generation unit may generate the print data, which include mechanism control data used for controlling a mechanism of the first printer, on the basis of mechanism control data included in the internal print data.

The raster image data generation unit may obtain the internal print data by way of a predetermined program which provides the first printer with an output upon receipt of an input from the plurality of programs; and print data generated by the print data generation unit may be output to the first printer by way of the predetermined program. Here, the "predetermined program" is, for example, a program which is not dependent on the model of a printer. For example, the predetermined program is a "language monitor program" in a computer where Windows OS (Registered Trademark) manufactured by Microsoft Corporation is executed as an operating system. For example, the predetermine program is a so-called "port emulator program."

(5) A method for controlling the print system according to claim 1, the method including: generating the raster image data by the raster image data generation unit based on the internal print data and a memory content of a font image data storage unit that stores font image data corresponding to a font stored in the second printer; generating the print data by the print data generation unit, the print data being used for causing the first printer to form an image based on the raster image data; and outputting the generated print data from the print data output device to the first printer.

(6) A method for installing a print data output program into the print system according to claim 1, wherein the print data output device is a computer including a program storage unit that stores one or more print data output program including the first print data output program, wherein the method is for installing a second print data output program corresponding to the first print data into the computer. The computer includes: a execution unit that executes application program; an identification information storage unit that stores one or more identification information for identifying the print data output program, the identification information storing the identification information in association with each of the print data output program; a storage unit that stores at least one of the identification information in association with the application program; and an output unit that outputs the print data that corresponds to the application program by the print data output program identified by the identification information that is associated with the application program. The method includes: storing the second print data output program into the program storage unit; and updating information in the identification information storage unit by associating the identification information that is associated with the first print data output program with the second print data output program in place of the first print data output program.

According to one or more embodiments of the present invention, changing of a printer directed to the printout can be made without changing the setting to let the printout requested by the application program is performed by the new printer. Accordingly, labor required to the user of the printer for changing the printer is diminished.

(6) A print data output program installation method including: an update step of updating information in the identification information storage means such that tentative identification information used for identifying the second print data output program is generated and such that the second print data output program and the tentative identification information are stored while being associated with each other. The update step may include an identification information acquisition step of acquiring identification information stored in the identification information storage means and being associated with the first print data output program; and a step of updating the identification information, which is stored in the identification information storage means and is associated with the second print data output program, from the tentative identification information to identification information acquired in the identification information acquisition step. Here, "generation of tentative identification information" and "associated storage of the second print data output program and the tentative identification information" may be performed integrally or separately.

The computer may include one or a plurality of interfaces used for establishing a communicable connection with a printer. The identification information storage means may store information for specifying the one or the plurality of interfaces in association with the identification information. The update step may include an interface specification information acquisition step of acquiring the interface specification information used for specifying an interface connected to a printer associated with the second print data output program; and a step of updating information in the identification information storage means such that identification information associated with the first print data output program is stored while being associated with interface specification information acquired in the interface specification information acquisition step.

The foregoing description of specific embodiments has been presented for purposes of illustration and description. It is not intended to be exhaustive or to limit the invention to the precise form disclosed. Modifications and variations are possible in light of the above teachings or may be obtained from practice of the invention. The disclosed embodiments were is chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A print system comprising:
a first printer; and
a print data output device that is communicably connected to the first printer and outputs to the first printer print data generated based on internal print data generated by any of a plurality of programs,
wherein the internal print data comprises:
data corresponding to a second printer that is different from the first printer and is used for causing the second printer to form an image; and
data for specifying at least one font that is stored in the second printer; and
wherein the print data output device comprises:
a printer-retained information storage unit that stores a font image data copy of a font image data that is stored in the second printer;
an intermediate data generation section that generates raster image data based on the internal print data corresponding to the second printer and the font image data copy; and
a print data generation section that generates print data used for causing the first printer to form an image based on the raster image data on an image recording medium,
wherein the printer-retained information storage unit is configured to store second printer-retained information that is based on information stored in the second printer, and
wherein the intermediate data generation section generates the raster image data based on the second printer-retained information in addition to the internal print data and the font image data.

2. The print system according to claim 1, wherein the font stored in the second printer is a bitmap font.

3. The print system according to claim 1,
wherein the second printer forms the image on the image recording medium in a predetermined resolution, and
wherein the font image data stored in the second printer is a font conforming to the predetermined resolution.

4. The print system according to claim 1,
wherein the printer-retained information storage unit is configured to further store first printer-retained information that is based on information stored in the first printer, and
wherein the print data generation section generates the print data based on the first printer-retained information in addition to the raster image data.

5. The print system according to claim 1,
wherein the internal print data includes second printer mechanism control data used for controlling a mechanism of the second printer; and
wherein the print data generation section generates the print data that includes first printer mechanism control data used for controlling a mechanism of the first printer, based on the second printer mechanism control data included in the internal print data.

6. The print system according to claim 1,
wherein the intermediate data generation section obtains the internal print data through a predetermined program that provides the first printer with an output upon receipt of an input from the plurality of programs.

7. A method for generating print data based on internal print data that is generated by one of a plurality of programs in a print system, the method comprising:
storing a font image data cosy of font image data stored in a second printer;
storing second printer-retained information that is based on information stored in the second printer;
generating the internal print data corresponding to the second printer;
generating a raster image data based on the internal print data and the font image data copy and on the second printer-retained information in addition to the internal print data and the font image data; and
generating print data for causing a first printer to form an image based on the raster image data.

8. A method for installing a first print data output program corresponding to a first printer, and a second print data output program corresponding to a second printer into a print system, the method comprising:
executing an application program;
obtaining and storing identification information for identifying the second printer that is installed in the print system;
detecting the first printer installed in the print system;
installing the first print data output program, wherein the first print data output program converts print data generated for causing the second printer to perform printing into print data for causing the first printer to perform printing, wherein the first printer replaces the second printer; and
updating stored print data output program information in the second print data output program associated with the second printer to information associated with the first print data output program.

9. The method according to claim 8, further comprising:
generating the tentative identification information used for identifying the first print data output program and storing the first print data output program and the tentative identification information while being associated with each other,
wherein the step of updating comprises: updating the information, which is associated with the first print data output program, from the tentative identification information to the identification information.

10. The method according to claim 8, further comprising:
establishing a communicable connection with the second printer through one or more interfaces, wherein the identification information stored includes interface specification information for specifying the interface in association with the established communicable connection, and
wherein updating the stored information associated with the second print data output program comprises:
obtaining interface specification information used for specifying an interface through which a communicable connection to the first printer is established; and
updating the stored information associated with the second print data output program such that interface identification information stored is associated with the first print data output program with the obtained interface specification information for the first printer.

11. A non-transitory computer-readable medium storing a program for causing a computer to function as a print system that outputs to a first printer print data based on internal print data generated by any of a plurality of programs and include data used for specifying at least one font stored in a second printer different from the first printer, and causes the first printer to produce a printout based on the print data, the program causing the computer to perform procedures comprising:
storing a font image data copy of font image data stored in the second printer;
storing second printer-retained information that is based on information stored in the second printer;
generating the internal print data corresponding to the second printer;
generating a raster image data from the internal print data and the font image data copy and from the second printer-retained information in addition to the internal print data and the font image data; and
generating the print data used for causing the first printer to form an image on an image recording medium based on the raster image data.

12. A non-transitory computer-readable medium storing an installation program for causing a computer to install therein a first print data output program corresponding to a first printer and a second print data output program corresponding to a second printer, the computer installation program for causing the computer to perform steps comprising:
executing an application program;
obtaining and storing identification information for identifying the second printer that is installed in a print system;
detecting the first printer installed in the print system;
installing the first print data output program, wherein the first print data output program converts print data generated by the second print data output program for causing the second printer to perform printing into print data for causing the first printer to perform printing, wherein the first printer replaces the second printer; and
updating stored print data output program information in the second print data output program associated with the second printer to information associated with the first print data output program.

13. A print system comprising:

a first printer; and a print data output device that is communicably connected to the first printer and is adapted to output to the first printer print data generated based on internal print data generated by any of a plurality of programs, wherein the print data output device comprises:

a printer-retained information storage unit that obtains and stores the second printer-retained information that is stored in a second printer;

an intermediate data generation section that generates raster image data based on the internal print data and the second printer-retained information;

an internal print data generation section that generates the internal print data corresponding to the second printer; and a print data generation section that generates the print data used for causing the first printer to form an image based on the raster image data on an image recording medium.

14. The print system of claim 13, further comprising a language monitor program that comprises the printer-retained information storage unit, the intermediate data generation section, and the print data generation section.

15. The print system of claim 13 further comprising:

a language monitor program that comprises the intermediate data generation section, and a print data conversion program that comprises the printer-retained information storage unit and the print data generation section.

16. The print system of claim 13 further comprising:

a language monitor program that comprises the intermediate data generation section and the printer-retained information storage unit, and a print data conversion program that comprises the print data generation section.

17. The print system of claim 13 further comprising:

a language monitor program that comprises the intermediate data generation section and the print data generation section, and a print data conversion program that comprises the printer-retained information storage unit.

* * * * *